United States Patent

Kottas et al.

[11] 4,346,976
[45] Aug. 31, 1982

[54] DEVICE FOR AUTOMATIC RECIPROCATION OF LENS ANGLE AND APERTURE OF SURVEILLANCE CAMERA

[76] Inventors: Milo Kottas; Mary E. Kottas, both of Box 187, Milligan, Fillmore County, Nebr. 68406; Robert P. Kottas, 3000 Farnam St., Apt. 5D, Omaha, Douglas County, Nebr. 68131; Charles E. Kottas, P.O. Box 1006, Grand Island, Hall County, Nebr. 68801; Joseph W. Kottas, 1640 Burr St., Lincoln, Lancaster County, Nebr. 68502

[21] Appl. No.: 242,874

[22] Filed: Mar. 12, 1981

[51] Int. Cl.$^3$ .................. G03B 3/00; G03B 13/02; G03B 7/08
[52] U.S. Cl. ................... 354/196; 352/140; 352/141; 354/42
[58] Field of Search ............ 354/196, 42, 43, 271; 352/140, 141, 178, 179

[56] References Cited

U.S. PATENT DOCUMENTS

| | | | |
|---|---|---|---|
| 2,196,097 | 4/1940 | Brown | 352/141 |
| 2,492,646 | 12/1949 | Kaeburn | 352/141 X |
| 2,885,471 | 5/1959 | King | 352/141 X |
| 3,517,597 | 6/1970 | Rauffer | 352/140 X |
| 3,631,786 | 1/1972 | Crapsey | 352/140 X |
| 4,141,636 | 2/1979 | Shimojima | |
| 4,195,924 | 4/1980 | Stemme et al. | |

FOREIGN PATENT DOCUMENTS

| | | | |
|---|---|---|---|
| 2441274 | 3/1976 | Fed. Rep. of Germany | 352/141 |
| 2122329 | 12/1979 | Fed. Rep. of Germany | 352/140 |

Primary Examiner—Donald A. Griffin
Attorney, Agent, or Firm—Henderson & Sturm

[57] ABSTRACT

A surveillance camera which automatically and continually varies both the lens angle and the aperture is provided. In an area under surveillance where conditions dictating a need for varying the exposure and the field of a surveillance camera, a continually reciprocating lens angle and a continually varying lens aperture, obtains a variety of camera settings which results in at least some satisfactory exposures of the area.

4 Claims, 2 Drawing Figures

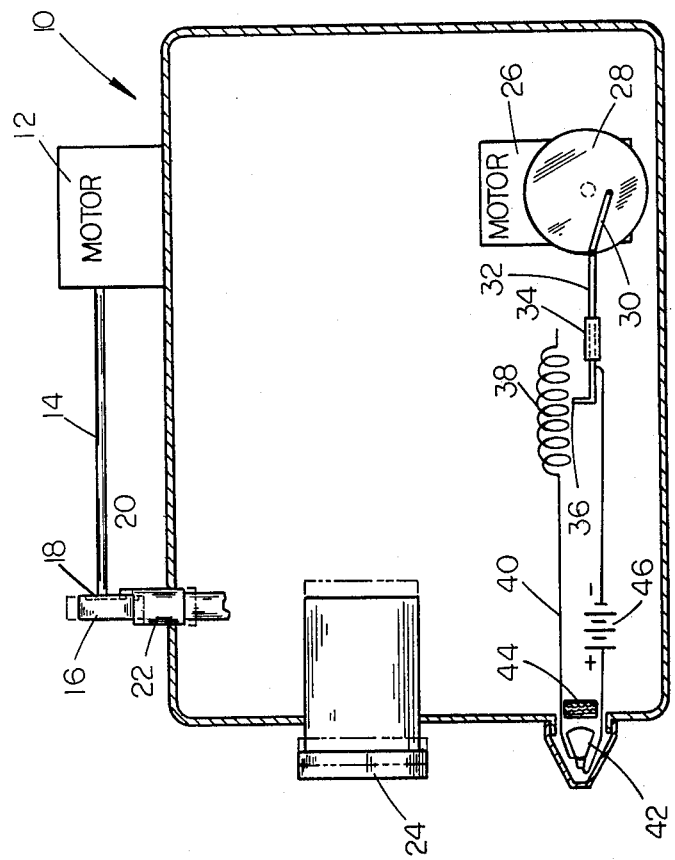
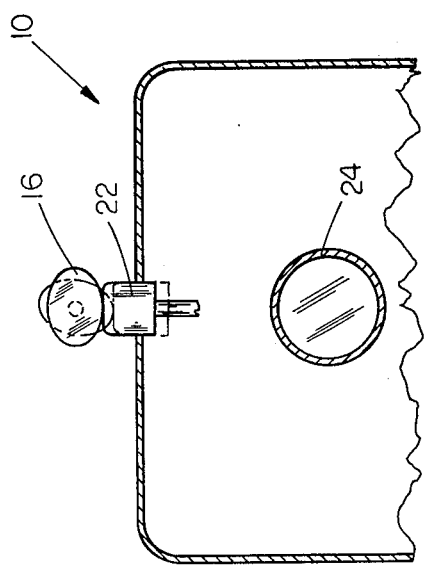

DEVICE FOR AUTOMATIC RECIPROCATION OF LENS ANGLE AND APERTURE OF SURVEILLANCE CAMERA

BACKGROUND OF THE INVENTION

1. Field of the Invention

The present invention relates generally to security surveillance devices and more particularly to surveillance cameras.

2. The Prior Art

In photography, lens angle and aperture setting determine size of the field and amount of light of the exposure, respectively. The efficacy of identifications of a subject or activity under differing conditions depends on the suitability of the particular lens settings to the conditions present in the area being surveyed at the moment such subjects or activities are photographed.

In the field of hidden camera surveillance, in which either a still camera takes photographs periodically or a movie camera or video camera is operating, known devices require that both the lens angle setting and the aperture setting be determined in advance. Whereas, such devices have proven valuable, because of the necessity of presetting, they sometimes give less than satisfactory or, even, unusable images.

Often, outdoor light conditions change because of the position of the sun, the advent of dawn or dusk, or a change in cloud conditions. Light conditions can also vary such as when an entranceway looking in or out is being viewed and the subject moves from indoors to outdoors or vice-versa. Also, if the room is lighted mainly by natural light, the same factors mentioned for outdoor variations can effect the indoor light conditions. Successful nightime surveillance can be hampered if the subject includes its own light source such as a flashlight or headlamps on a vehicle. Although, in general, traditional surveillance cameras have been helpful in subject identification, they have not been entirely satisfactory in situations wherein an adjustment of the aperture setting is required to compensate for variable light conditions.

Similarly, subjects within a viewing field do not always remain static. In some instances it might be desirable to view a large group of people and a, therefore, large field of vision is needed. However, at the next moment, a narrow field might be desirable for individual identification. Key activity might occur at different locations calling for a wide viewing field in yet other situations. Further, it might be desirable to watch both an entire storage area, plus have close-ups of a particular portion thereof, such as where a safe or high value property is located. Traditional surveillance cameras having a static field, while being helpful generally, are less than satisfactory in these and other situations.

SUMMARY OF THE INVENTION

Accordingly, the present invention provides a mechanism for automatically and continually varying the lens angle and aperture size allowing a variety of different settings which will result in at least some satisfactory exposures and likely a variety of exposures of value for different purposes. It is better to have random variations in camera settings resulting in a good chance of obtaining more definite and revealing exposures than to have static settings with the possibility of no usable exposures.

An object of the present invention is to provide an improved surveillance camera.

Another object is to provide a surveillance camera which will automatically reciprocate the lens angle width between a wide and a narrow setting.

A further object of the invention is to provide a surveillance camera which will automatically reciprocate the lens aperture between a large and a small opening.

Still another object is to provide a surveillance camera which will automatically reciprocate both the lens angle width and the lens aperture between set limits.

A still further object is the provision of a surveillance camera which will take some adequate pictures regardless of varying extent of field requirements, varying extent of exposure requirements or the combination of both.

Yet another object is to provide a surveillance camera which will reciprocate the extent of field requirements, exposure requirements or both in which the minimum(s) and maximum(s) can be varied.

Other objects, advantages, and novel features of the present invention will become apparent from the following detailed description of the invention when considered in conjunction with the accompanying drawings.

BRIEF DESCRIPTION OF THE DRAWINGS

FIG. 1 is a diagrammatic side elevation view of a camera for use in the present invention;

FIG. 2 is a diagrammatic partial front view of the camera of FIG. 1.

DESCRIPTION OF THE PREFERRED EMBODIMENT

Referring now to the drawings wherein like reference numerals designate identical or corresponding parts through the different views, and to both FIGS. 1 and 2, the housing of an amateur camera (e.g., super-8) is diagrammatically illustrated and depicted generally as 10.

A variable speed motor 12 for reciprocating a zoom control button 22 of a type commonly used on such cameras, is affixed to the top of the camera 10 by threaded fasteners or equivalent as is well known in the art. A rigid drive shaft 14 of motor 12 attached at its free end to an actuator 16, having an eliptical groove 18 on its backside, causes the actuator 16 to revolve at a predetermined rate. The actuator 16 is attached to the shaft 14 by the use of threads on the shaft 14 which correspond to a threaded opening in the center of actuator 16, thus allowing easy removal of the actuator 16 and substitution of actuators having eliptical grooves 18 with different sized maximum and minimum diameters, if so desired, the advantage of which will be explained shortly. The actuator 16 is operatively attached to the zoom control button 22 of the camera 10 by an inverted L-shaped tongue 20 affixed atop button 22 and oriented so as to operatively sit in said eliptical groove 18 on the backside of the actuator 16. The rotating motion of the actuator 16 causes the zoom control button 22 to reciprocate, thereby causing the zoom lens component 24 to alternate between a normal setting as shown by the solid lines in FIG. 1 and a zoomed in setting as shown by the phantom lines in FIG. 1. It should be appreciated that not only can the speed of reciprocation be altered by varying the speed of motor 12, but both the minimum and maximum settings of the lens angle width can be independently varied by substituting actuator 16 with another having the desired different dimensions.

A motor 26 for reciprocating an automatic exposure meter 44 of a type commonly used on such camera, is affixed to the side of the camera 10 by threaded fasteners or equivalent as is well known in the art. A wheel 28 is rigidly attached to the drive shaft of motor 26 and rotated thereby at a predetermined rate. A connecting rod 30 is pivotally attached at one end to a point on wheel 28 away from its center and at the other end to electrical conductor rod 32 which slides within sleeve 34, sleeve 34 being appropriately affixed to and located on the side of the camera 10. Also affixed to the side of camera 10 are electrical contact 36 and electrical resistor 38 of circuit 40. Electrical conductor rod 32 is so positioned between electrical contact 36 and resistor 38 that current will always travel in circuit 40 through all three said elements regardless of the position of electrical conductor rod 32 within sleeve 34. In addition, the three elements are so positioned on the side of the camera 10 that when electrical conductor rod 32 is nearer motor current must travel through a greater length of resistor 38 and when electrical conductor rod 32 is further from motor 26 current must travel through a lesser length of resistor 38.

Other elements in circuit 40 are power source 46, which may be any of a number of types well known in the art and shielded light source 42 which is rigidly attached to camera 10 in such fashion that light may be directed to and concentrated on automatic exposure meter 44.

In operation, electrical conductor rod 32 reciprocates horizontally across resistor 38 as motor 26 turns, thereby causing the current in the circuit 40 to vary as a function of the varying amount of resistance of resistor 38 within circuit 40. Shielded light source 42 which is directed at the automatic exposure meter 44 of camera 10 will thereby alternate between bright and dark as the current in the circuit 40 varies. Accordingly, the change in lumens of candle power sensed by the automatic exposure meter 44 will cause the aperture of the camera 10 to correspondingly change in size in a manner well known in the art. It should also be appreciated that certain of these elements of the aperture reciprocating assemblage may be replaced by others of different sizes to vary the extent and frequency of the reciprocation of the aperture size.

In this preferred embodiment, both the zoom reciprocating assemblage of elements and the aperture reciprocating assemblage of elements are affixed to the camera. It is thus obvious that either assemblage may be independently operated or that they may be simultaneously operated at whatever extents and frequencies of reciprocation are necessary to produce any desired effect.

Obviously, numerous modifications and variations of the present invention are possible in light of the above teachings. It is therefore to be understood that within the scope of the appended claims, the invention may be practiced otherwise than as specifically described herein.

I claim:

1. A surveillance camera comprising: a lens of variable angle and motor actuated cam means for automatically and continually reciprocating the angle of the lens between a wide setting and a narrow setting.

2. A surveillance camera comprising:
   a lens of variable angle and variable aperture linked to an automatic exposure meter, motor actuated cam means for continually reciprocating the angle of the lens between a wide setting and a narrow setting, and a motor operated luminous means for automatically and continually reciprocating the opening of the aperture between a large opening and a small opening.

3. A surveillance camera comprising: a variable aperture linked to an automatic exposure meter and a motor operated luminous means for automatically and continually reciprocating the opening of the aperture between a large opening and a small opening.

4. A surveillance camera comprising:
   a lens of variable angle and variable aperture linked to an automatic exposure meter, motor actuated cam means for automatically and continually reciprocating the angle of the lens between a wide setting and a narrow setting, and motor operated luminous means for continually reciprocating the opening of the aperture between a large opening and a small opening.

* * * * *